United States Patent
Lo et al.

(10) Patent No.: US 8,436,555 B2
(45) Date of Patent: May 7, 2013

(54) DC LOW VOLTAGE DISTRIBUTION BOX FOR INDOOR MULTI LEDS LAMP

(75) Inventors: Honhung Lo, Hong Kong (CN); Kuan Ding, Jiangsu (CN)

(73) Assignees: Honhung Lo, N.T. Hong Kong (CN); Shangzhong Jin, Hangzhou (CN)

( * ) Notice: Subject to any disclaimer, the term of this patent is extended or adjusted under 35 U.S.C. 154(b) by 264 days.

(21) Appl. No.: 12/742,990

(22) PCT Filed: Nov. 12, 2008

(86) PCT No.: PCT/CN2008/073022
§ 371 (c)(1),
(2), (4) Date: Sep. 7, 2010

(87) PCT Pub. No.: WO2009/067923
PCT Pub. Date: Jun. 4, 2009

(65) Prior Publication Data
US 2011/0018464 A1    Jan. 27, 2011

(30) Foreign Application Priority Data
Nov. 14, 2007    (CN) .................. 2007 2 0191685 U

(51) Int. Cl.
*H05B 37/02*    (2006.01)

(52) U.S. Cl.
USPC ..................... 315/299; 315/287; 315/362

(58) Field of Classification Search .................. 315/246, 315/250, 254, 276, 283, 287, 291, 294, 299, 315/300, 362
See application file for complete search history.

(56) References Cited

U.S. PATENT DOCUMENTS

| | | | |
|---|---|---|---|
| 5,534,768 A * | 7/1996 | Chavannes et al. | 323/267 |
| 7,274,175 B2 * | 9/2007 | Manolescu | 323/267 |
| 7,358,707 B2 * | 4/2008 | Johnson et al. | 323/267 |

* cited by examiner

*Primary Examiner* — Thuy Vinh Tran
(74) *Attorney, Agent, or Firm* — Novak Druce Connolly Bove + Quigg LLP

(57) ABSTRACT

A low-voltage DC distribution board for indoor LED lighting with multiple LED lamps, comprises: a power converting module (2), arranged within a box casing (7) and connected with a power input port (1), the power converting module (2) including a set of output ports (3) with different output voltages; a set of selection switches (4) connected between the set of output ports of the power converting module (2) and a plurality of current regulators (5) which are connected to load connectors (6).

9 Claims, 1 Drawing Sheet

DC LOW VOLTAGE DISTRIBUTION BOX FOR INDOOR MULTI LEDS LAMP

CROSS-REFERENCE TO RELATED APPLICATIONS

This application is a national stage application, under 35 U.S.C. §371, of PCT/CNO8/073022, filed Nov. 12, 2008, which claims priority of Chinese Application No. 200720191685.8, filed Nov. 14, 2007.

TECHNICAL FIELD

The present invention relates to equipments for indoor low-voltage distribution, and particularly to a distribution board that is used to convert AC input power or solar DC input power into a low-voltage direct current output for indoor LED lighting with multiple LED lamps.

BACKGROUND

With the rapid development in semiconductor lighting industry, the electro-optical conversion efficiency of a LED is up to 70~120 lm/W, which is far more than that of an Incandescent lamp and will exceed the efficiency of a Fluorescent lamp. Recently, LED has been widely used in various applications such as road lighting, landscape lighting, etc., and will be used in the area of residential lighting soon.

However, as a LED is typically operated only under DC power, the AC power from the main supply can be used to drive a LED only after the AC-DC conversion. For this reason, it is necessary to provide a power converting device for LEDs to be connected to the existing AC power supply network. Presently, each of the existing LED devices is supplemented with an individual power adapter connecting to an AC electric power socket. This way causes much higher costs due to the excessive use of multi-quantities of converting devices.

The LED lamp is a new kind of light source with advantages of energy saving, environment protecting, small size, multi-color and long life. But it is difficult to supply power to LEDs because of their sharp voltage-current characteristics. Unlike incandescent lamps, a LED lamp cannot be driven directly by unconverted AC power or unregulated DC power, since a small fluctuation in voltage would lead to a significant change in current and may even burn up the LED.

Moreover, there is a need to adjust LED luminosity in many applications. For example, dimming function is typically required in a LED reading lamp to provide different brightness and contrast. Two methods may be utilized to adjust the LED luminosity, that is, analog dimming method and PWM (Pulse Width Modulation) dimming method. The linear dimming may be easily implemented by analog method, but it has a disadvantage of color-shifting, thereby it is not suitable for the applications where fine and accurate dimming is required. Though the PWM dimming may solve this problem, it needs a special driving module.

Additionally, the existing cables for indoor distribution network typically carry voltages of 110V or 220V, according to the main power supply. Thus, they must be protected against electric shock for safe use. This results in a much higher cost comparing with a low-voltage DC distribution wires.

SUMMARY OF THE INVENTION

In order to solve the problems as described in the last paragraph, the present invention provides a low-voltage DC distribution board mounted in a box casing for indoor LED lighting where multiple LED lamps are connected. The board in the distribution box according to an embodiment of the present invention can supply each of the LED lamps with a constant current under a low DC voltage, so that the LED lamps are able to operate in a reliable state and have a better performance in luminosity adjustment. Some advantages of this invention are free of pollution, dimmable and energy saving, especially as compared with the situation that each of LED lamps has to be equipped with a separate power converter. Another advantage of this invention is the use of low-voltage cables as the distribution wires in the installation of indoor power distribution network, this is a low cost, safe and easy-installation solution.

According to an embodiment of the invention, a low-voltage DC distribution board for indoor LED lighting, wherein the distribution board is mounted in a box casing and comprises:
a power input port,
a power converting module, connected to the power input port, wherein the power converting module has a set of output ports with different voltages;
a set of selection switches, connected to the set of output ports of the power converting module; and
a number of current regulators, connected to the set of selection switches.

In the low-voltage DC distribution board for indoor LED lighting according to an embodiment of the invention, AC power is supplied to the power input port and the power converting module includes voltage transformers, current rectifiers, filtering and regulating circuits.

In the low-voltage DC distribution board for indoor LED lighting according to an embodiment of the invention, solar DC power can be connected to the power input port, and the power converting module associated with the solar DC power has voltage and current regulation circuits.

In the low-voltage DC distribution board for indoor LED lighting according to an embodiment of the invention, the current regulator works as a PWM current regulator.

In the low-voltage DC distribution board for indoor LED lighting according to an embodiment of the invention, the current regulator work as a linear current regulator.

In the low-voltage DC distribution board for indoor LED lighting according to an embodiment of the invention, distribution wires working as the load connectors are connected between the current regulators and the LED lamps.

In the low-voltage DC distribution board for indoor LED lighting according to an embodiment of the invention, the DC-voltages outputs from the power converting module are ranging from 3V to 36V and is selectable in a stepwise arrangement with a step size of 4-8V, while the corresponding current regulator outputs provide constant currents of 10 mA~2 A.

According to the embodiments of the present invention, AC power or solar DC power is supplied to the input port of the distribution board which receives AC power or solar DC power from the input port and provides LED lamps with the constant working current of 10 mA~2 A under a DC voltage of 3~36V, so that the LED lamps may operate properly. The total range 3-36V of the DC output voltage may be divided into multiple steps of 4~8V each. Thus, the distribution board may be connected to various LED lamps in a distribution network of multi-path configuration, thereby achieving centralized power supply for all of the LED lamps. Such a distribution board can be used for both newly-constructed and completely-constructed residential homes as well as office buildings for low-voltage LED lighting.

Figure 1:
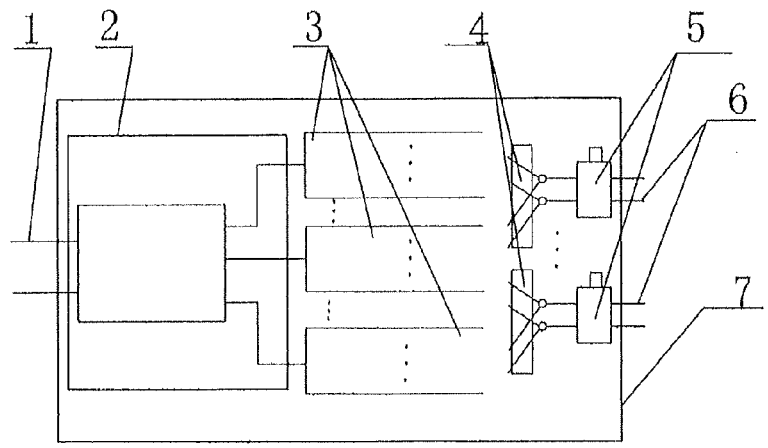
FIG. 1 is a schematic diagram showing the structure of the low-voltage DC distribution board for indoor LED lighting where multiple LED lamps are connected.

In the drawings, the reference numbers refer to the following elements respectively:

1—power input port;
2—power converting module;
3—output ports;
4—selection switches;
5—current regulators;
6—load connectors;
7—box casing.

DETAILED DESCRIPTION OF THE INVENTION

The present invention is further described in details in connection with the attached drawings as below.

Figure 2:
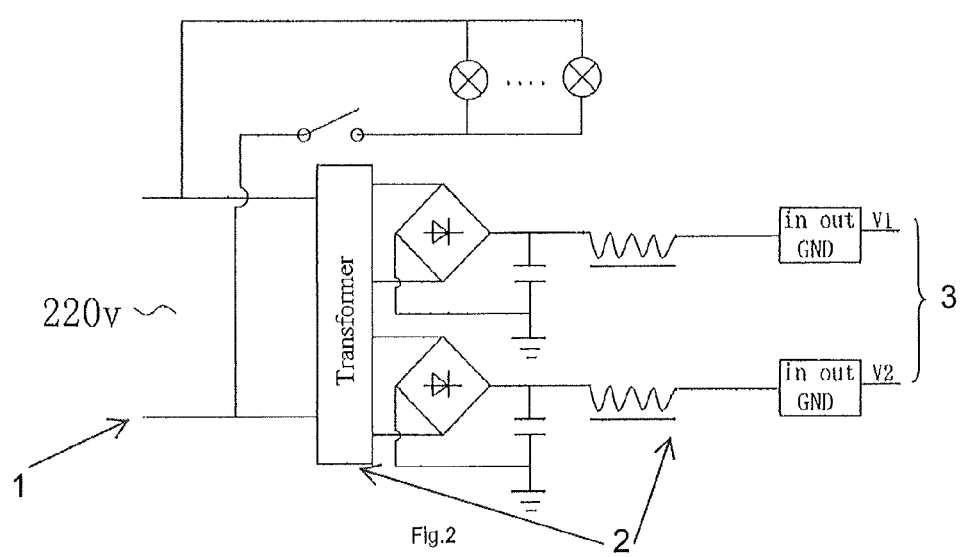
FIG. 2 is a block diagram illustrating the power converting module according to an embodiment of the present invention.
Figure 3:
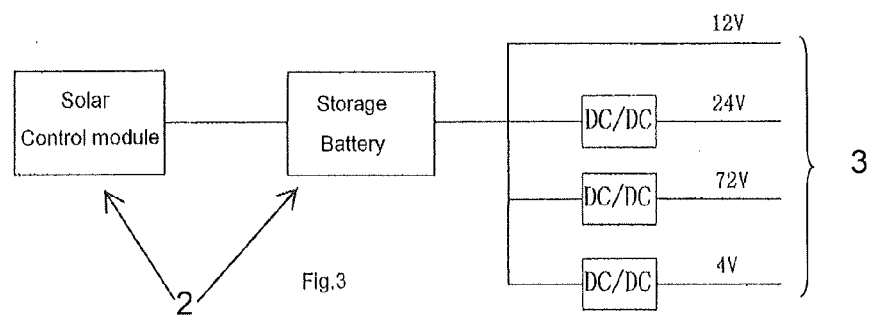
FIG. 3 is a block diagram illustrating the power converting module according to another embodiment of the present invention.

FIGS. 1-3 illustrate a low voltage distribution board for indoor LED lighting where multiple LED lamps are connected. The distribution board is mounted in a box casing 7 and comprises a power converting module 2 mounted therein. The power converting module 2 is connected to a power input port 1, and includes voltage transformers, current rectifiers, filtering and regulating circuits connecting together. Alternatively, the power converting module 2 is connected to DC solar power and this connection comprises a solar power control module, storage battery, voltage and current regulating circuits. The power converting module 2 may generate a number of different voltages to each of the output ports 3. More than one selection switches 4 are connected between the output ports 3 and the current regulators 5. The current regulators 5 may be PWM regulators or linear dimming. Distribution wires working as load connectors 6 are connected from the distribution board to the indoor LED lamps.

The power input port 1 is used to receive an input of 220V AC working at the main power supply frequency. The AC power input is then transformed, rectified, filtered and regulated in the power converting module 2 to form, for example, two DC power sources with 16V and 24V output voltages and 10 mA~2 A regulated current respectively. If four 1 W high-power white LED lamps (each having a rating current of 350 mA) are connected in series as the load, the selection switches 4 are switched to the 16V DC power, and the corresponding current regulator 5 is adjusted to regulate the output current to be 350 mA with PWM or linear dimming. After the circuit connection is completed, the ON-OFF switching of LED lamps can be operated.

For areas where AC power is not available, the distribution board according to the present invention may be fitted in a plastic casing with power converting module connecting to the solar battery controller, in order to form a new-type DC distribution board for providing power supply to the loads such as LED lamps via indoor distribution network system. The storage battery of the solar power has an output of 12V DC power which is converted by the circuits of voltage transformation and current regulating of this invention into multiple DC power outputs with different voltages ranging from 3V to 36V and each DC power output is regulated within 10 mA~2 A currents. If nine 1 W high-power white LED lamps are connected to form three groups of LED lamps in series, each group having 3 LEDs connected in parallel, the selection switches 4 are set to, for example, 12V DC power, and the corresponding current regulator 5 is adjusted to regulate the output currents to be 1 A with either PWM or linear dimming. After the circuit is connected properly, the ON-OFF switching of LEDs can be operated.

In this invention, the output of the distribution board is in a range of low voltages, this output allows the indoor distribution system to utilize the low-voltage electric wires which are low cost, much safer and easy to install, and there is no need to put the wires inside plastic pipes to protect against electric shock. Therefore, the low-voltage DC output after regulation can solve the above-mentioned problem caused by the sharp voltage-current characteristics of LED.

What is claimed is:

1. A low-voltage DC distribution board for indoor LED lighting with multiple LED lamps, comprises:
   a power input port;
   a power converting module, connected to the power input port, wherein the power converting module has a set of output ports with different output voltages and is configured to convert a power input supplied to the input port into multiple DC outputs with different voltages for outputting from the set of output ports;
   a set of selection switches, connected to the set of output ports, wherein each switch is configured to select one of the multiple DC outputs;
   a number of current regulators, connected to the set of selection switches, for adjusting the current of the DC output selected by each corresponding selection switch.

2. The low-voltage DC distribution board for indoor LED lighting with multiple LED lamps of claim 1, wherein AC power is supplied to the power input port, and the power converting module includes voltage transformers, current rectifiers, filters and regulating circuits for generating the DC outputs with respective constant current.

3. The low-voltage DC distribution board for indoor LED lighting with multiple LED lamps of claim 1, wherein solar DC power is supplied to the power input port and the power converting module includes voltage and current regulating circuits.

4. The low-voltage DC distribution board for indoor LED lighting with multiple LED lamps of claim 1, wherein the current regulators are of PWM current dimming.

5. The low-voltage DC distribution board for indoor LED lighting with multiple LED lamps of claim 1, wherein the current regulators are of linear current dimming.

6. The low-voltage DC distribution board for indoor LED lighting with multiple LED lamps of claim 1, wherein electric wires are connected from the current regulators to the LED lamps.

7. The low-voltage DC distribution board for indoor LED lighting with multiple LED lamps of claim 1, wherein the power converting module provides multiple DC voltages outputs ranging from 3V to 36V in steps of 4-8V each and the corresponding current regulators provide constant current outputs ranging from 10 mA to 2 A.

8. The low-voltage DC distribution board for indoor LED lighting with multiple LED lamps of claim 1, wherein the outputs of current regulators are 36V or lower so that it is harmless to human bodies.

9. The low-voltage DC distribution board for indoor LED lighting with multiple LED lamps of claim 1, wherein distribution wires connected from the current regulators to the LED lamps are low voltage cables for voltages 36V or lower.

* * * * *